(12) United States Patent
Sadri et al.

(10) Patent No.: US 11,036,417 B2
(45) Date of Patent: Jun. 15, 2021

(54) METHODS AND SYSTEMS FOR OBJECT LEVEL DE-DUPLICATION FOR SOLID STATE DEVICES

(71) Applicant: Western Digital Technologies, Inc., San Jose, CA (US)

(72) Inventors: Mohammad R. Sadri, Santa Ana, CA (US); Siddharth Choudhuri, Santa Ana, CA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 124 days.

(21) Appl. No.: 16/191,210

(22) Filed: Nov. 14, 2018

(65) Prior Publication Data

US 2019/0079691 A1    Mar. 14, 2019

Related U.S. Application Data

(63) Continuation of application No. 13/303,870, filed on Nov. 23, 2011, now Pat. No. 10,162,553.

(60) Provisional application No. 61/416,880, filed on Nov. 24, 2010.

(51) Int. Cl.
   *G06F 3/06* (2006.01)
   *G06F 11/14* (2006.01)

(52) U.S. Cl.
   CPC .......... *G06F 3/0641* (2013.01); *G06F 3/0608* (2013.01); *G06F 3/0688* (2013.01); *G06F 11/1453* (2013.01)

(58) Field of Classification Search
   CPC .............................. G06F 3/0641; G06F 3/0608
   See application file for complete search history.

(56) References Cited

U.S. PATENT DOCUMENTS

| | | | |
|---|---|---|---|
| 5,627,533 A * | 5/1997 | Clark | ...................... G06T 9/005 341/51 |
| 6,738,355 B1 | 5/2004 | Love et al. | |
| 7,702,870 B2 | 4/2010 | English | |
| 7,822,887 B2 | 10/2010 | Torabi et al. | |
| 7,822,939 B1 | 10/2010 | Veprinksy et al. | |
| 8,074,074 B2 * | 12/2011 | Takagi | .................. G06T 1/0057 380/200 |
| 8,117,464 B1 | 2/2012 | Kogelnik | |
| 8,195,688 B1 * | 6/2012 | Sawhney | ............ G06F 16/1748 707/769 |
| 8,375,005 B1 * | 2/2013 | Claudatos | ............... G06F 16/13 707/654 |
| 9,465,823 B2 | 10/2016 | Shergill | |

(Continued)

*Primary Examiner* — Charles Rones
*Assistant Examiner* — Tian-Pong Chang
(74) *Attorney, Agent, or Firm* — Morgan, Lewis & Bockius LLP

(57) ABSTRACT

In one aspect, the present disclosure relates to a method of de-duplicating data in a solid state storage device. The method can include receiving a block of data to be written to a solid state storage device, wherein the block of data comprises header portion and a payload, wherein the header portion comprises context information; and determining whether the payload should be de-duplicated prior to storage, based on the context information stored within the header portion; if the payload is determined to be de-duplicated, de-duplicating the payload; and storing the de-duplicated payload to the solid state storage device.

19 Claims, 8 Drawing Sheets

(56) References Cited

U.S. PATENT DOCUMENTS

| | | |
|---|---|---|
| 2002/0169971 A1 | 11/2002 | Asano |
| 2006/0218400 A1 | 9/2006 | Kimmel et al. |
| 2009/0234870 A1* | 9/2009 | Bates ................ G06F 16/24556 |
| 2010/0077161 A1* | 3/2010 | Stoakes ............... G06F 11/1453 711/162 |
| 2010/0082672 A1 | 4/2010 | Kottomtharayil et al. |
| 2010/0088277 A1 | 4/2010 | Rao et al. |
| 2010/0114833 A1* | 5/2010 | Mu ......................... G06F 3/067 707/650 |
| 2010/0169948 A1* | 7/2010 | Budko .................... H04L 9/088 726/1 |
| 2010/0332454 A1* | 12/2010 | Prahlad ................ G06Q 50/188 707/654 |
| 2011/0016091 A1* | 1/2011 | Prahlad ................. G06F 16/162 707/654 |
| 2011/0066628 A1 | 3/2011 | Jayaraman |
| 2011/0071989 A1 | 3/2011 | Wilson et al. |
| 2011/0082840 A1 | 4/2011 | Jayaraman |
| 2011/0137870 A1* | 6/2011 | Feder .................... G06F 16/174 707/662 |
| 2011/0185149 A1 | 7/2011 | Gruhl |
| 2011/0225211 A1* | 9/2011 | Mukherjee .......... G06F 16/1748 707/812 |
| 2012/0131465 A1 | 5/2012 | Telek et al. |

* cited by examiner

METHODS AND SYSTEMS FOR OBJECT LEVEL DE-DUPLICATION FOR SOLID STATE DEVICES

CROSS REFERENCE TO RELATED APPLICATIONS

This application is a continuation of Application Ser. No. 13/303,870, filed on Nov. 23, 2011, now U.S. Pat. No. 10,162,553, which claims the benefit of U.S. Provisional Application No. 61/416,880, filed on Nov. 24, 2010, the entirety of each of which is incorporated herein by reference.

FIELD

The present disclosure relates to methods and systems for performing de-duplication processes on solid state devices.

BACKGROUND

In computing, data de-duplication is a specialized data compression technique for eliminating redundant data in a storage system. The technique is used to improve storage utilization and also can be applied to network data transfers to reduce the number of bytes sent across a link. In the de-duplication process, data objects or chunks are identified and stored during a process of analysis. As the analysis continues, other objects are compared to the stored copies and whenever a match occurs, the redundant object is replaced with a reference that points to the stored file. Given that the same byte pattern may occur dozens, hundreds, or even thousands of times (the match frequency is a factor of the file size), the amount of data that must be stored or transferred can be greatly reduced.

One method for de-duplicating data relies on the use of cryptographic hash functions to identify duplicate segments of data. If two different data sets generate the same hash value, this is known as a collision. The probability of a collision depends upon the hash function used. If a collision occurs, the system knows that it has already stored this data. Instead of re-storing the data, the system will replace the redundant data with the reference to the stored data.

Accordingly, storage-based data de-duplication inspects large volumes of data to identify large sections—such as entire files or large sections of files—that are identical, in order to store only one copy of the file. For example, a typical email system might contain 100 instances of the same one megabyte (MB) file attachment. Each time the email platform is backed up, all 100 instances of the attachment are saved, requiring 100 MB storage space. With data de-duplication, only one instance of the attachment is actually stored; the subsequent instances are referenced back to the saved copy for de-duplication, resulting in a compression ratio of roughly 100 to 1.

SUMMARY

In one aspect, the present disclosure relates to a method of de-duplicating data in a solid state storage device. The method can include receiving a block of data to be written to a solid state storage device, wherein the block of data comprises header portion and a payload, wherein the header portion comprises context information; and determining whether the payload should be de-duplicated prior to storage, based on the context information stored within the header portion; if the payload is determined to be de-duplicated, de-duplicating the payload; and storing the de-duplicated payload to the solid state storage device. In some embodiments, the context information includes metadata passed down to the SSD from application layers. In some embodiments, the metadata includes an indication of whether the payload comprises random data. In some embodiments, the metadata includes a sensitivity level. In some embodiments, the payload data includes a plurality of sub-objects. In some embodiments, the method includes de-duplicating based on a correlation between sub-objects of other payloads. In some embodiments, the SSD performs de-duplication. In some embodiments, the method includes before storing, separating out the header from payload and storing each in separate locations on the SSD. In some embodiments, the de-duplication occurs during garbage collection.

Another aspect of the present disclosure relates to a method for storing objects. The method includes receiving a data object; analyzing the data object to determine context information about the data object; and storing the context information in a header of the data object. In some embodiments, the method can include separating the data object into a plurality of sub-objects; and creating a separate header for each for the plurality of sub-objects. In some embodiments, the context information can include a sensitivity level. In some embodiments, the context information comprises an indication of whether the payload comprises random data.

In one aspect, the present disclosure relates to a solid state device for de-duplicating data prior to storage. In some embodiments, the solid state device includes a host interface for communicating to a host device; a flash memory for storing data; a de-duplication engine comprising logic stored in a computer readable medium, the logic configured to: receive a block of data to be written to a solid state storage device, wherein the block of data comprises header portion and a payload, wherein the header portion comprises context information; and determine whether the payload should be de-duplicated prior to storage, based on the context information stored within the header portion; if the payload is determined to be de-duplicated, de-duplicate the payload; and store the de-duplicated payload to the solid state storage device. In some embodiments, the context information can include metadata passed down to the SSD from application layers. In some embodiments, the metadata includes an indication of whether the payload comprises random data. In some embodiments, the metadata includes a sensitivity level. In some embodiments, payload data includes a plurality of sub-objects.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DESCRIPTION

The present disclosure describes an improved data de-duplication system and method where a solid state device (SSD) performs de-duplication using contextual hints about the data being stored. These hints are provided to the SSD by upper level application layers. By having the de-duplication engine in each of a plurality of SSDs in a storage system, the de-duplication process becomes more scalable because one host does not have to perform all the de-duplication functions for a plurality of storage devices. According to the disclosed embodiment, higher level application layers generate the contextual hints and methods for the SSD to use during a de-duplication process. In order for an SSD to take advantage of the present method, the SSD can be programmed with firmware in order to receive and process the contextual hints. Further, in order for the applications layer to embed the hints in the data files and to separate data into a plurality of sub-objects, the applications layer can be programmed with software of firmware to perform those functions. The application layer that provides the contextual hints is generally the software program that created, edited or viewed the file. The disclosed systems and methods can be used on both randomized data and non-random data.

Generally, randomized data, for example, compressed or encrypted data, are not good candidates for de-duplication algorithms. De-duplication algorithms utilize the fact that data has redundancies because the patterns and structures that exist in natural data sources (e.g.: text, images, etc.) are usually more limited than all the possible permutations of such data. When data is randomized, such patterns and structures disappear. However, randomized data usually contain metadata that can, most of the time, uniquely identify an object (a document, image, video, etc.). Such metadata usually exist as a header in a file containing the object. Sometimes an object's data are partitioned into sub-objects; each of which is preceded by a header that identifies the sub-object (for example a paragraph in a document or a frame in a video).

Figure 1A:
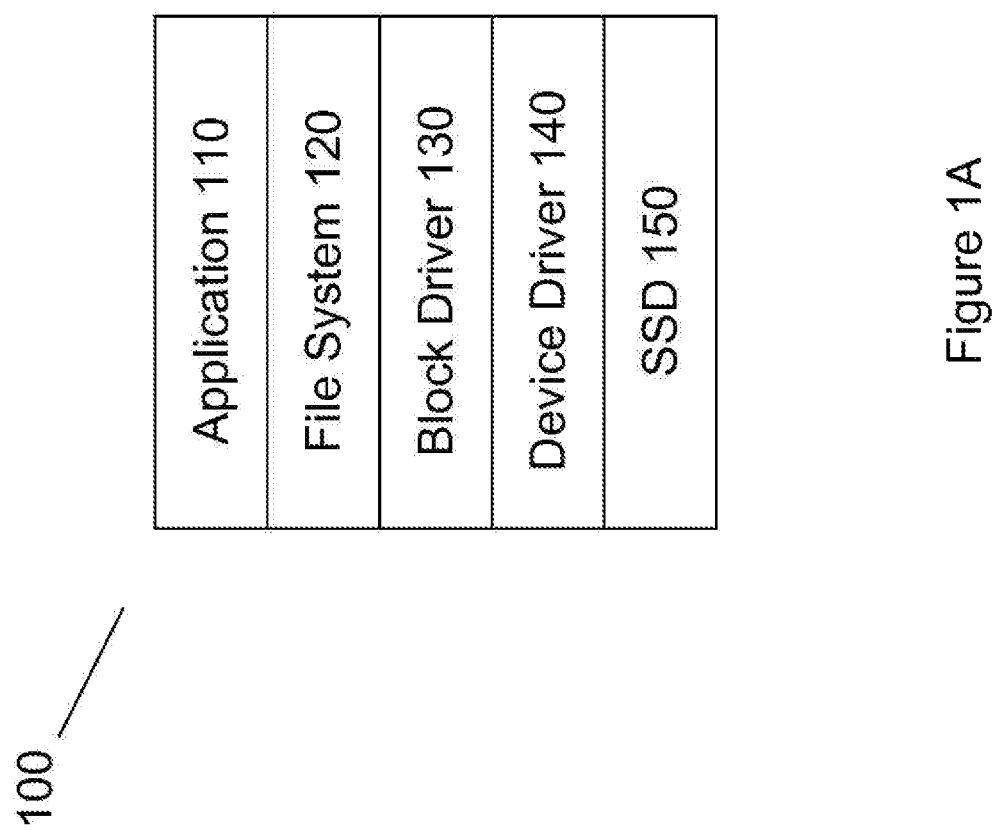
FIG. 1A depicts a hierarchical structure of a Solid State Storage Device (SSD) and higher application layers.

Accordingly, in order to effectively de-duplicate data, including randomized data, each SSD utilizes information from hierarchical layers above it. For example, the SSD can use the information from the upper layers as to which data blocks or objects should be de-duplicated. In computer and storage systems, data pass across layered software hierarchy before reaching a storage device 150 for storage of the data. As shown in FIG. 1, these hierarchies can include an application layer 110, a file system 120, a block layer 130, and a storage device driver 140. This flow of data across layered software hierarchies applies to Solid State Storage Devices (SSD) as well as traditional magnetic drives (Hard Disk Drives).

Figure 1B:
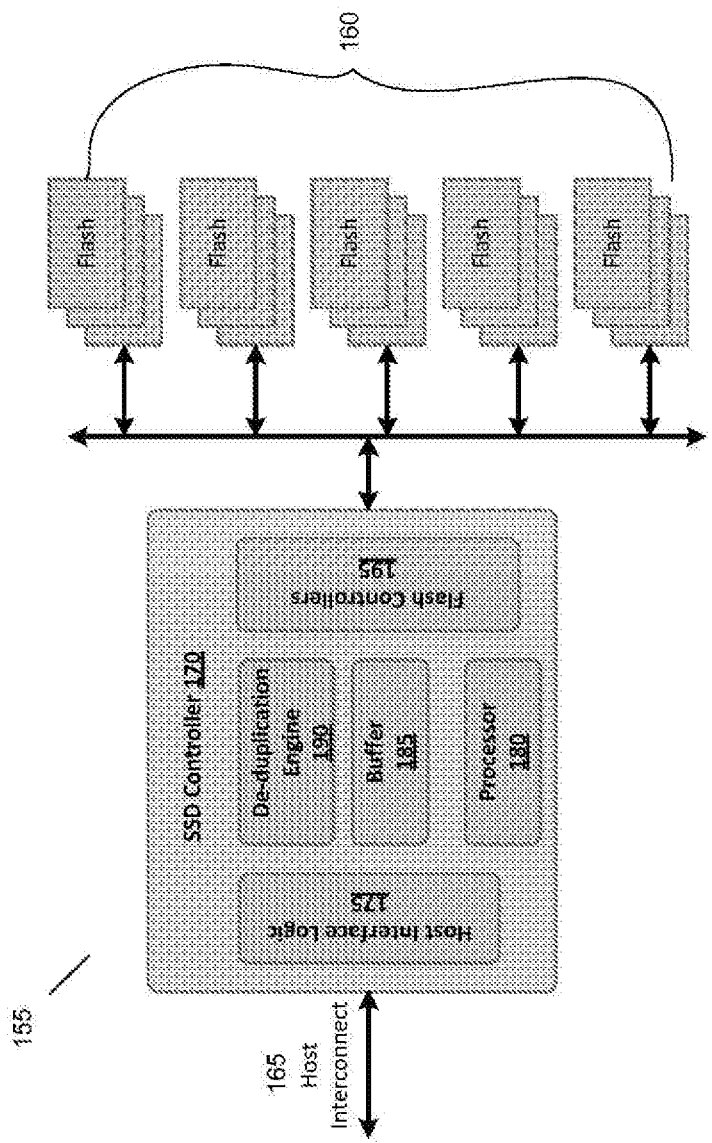
FIG. 1B depicts an SSD having a de-duplication engine.

FIG. 1B depicts a SSD 155. The operation of a solid state device is described in co-owned U.S. Pat. No. 7,822,887 "Multi-channel Solid-State Storage System" issued Oct. 26, 2010, the entire contents of which are incorporated by reference. SSD 155 includes one or more flash memories 160, a host interface 165, and an SSD controller 170. Host interface 165 connects the SSD 155 to a host. Flash memories 160 store data. SSD controller 170 controls the transfer of data from a host to flash memories 160.

SSD controller 170 includes host interface logic 175, a processor 180, a buffer 185, a de-duplication engine 190 and flash controllers 195. Host interface logic 175 manages the interface between SSD 155 and the host. Processor 180 manages the operations of SSD 155 using firmware. Buffer 185 buffers incoming data before the data are written for flash memories 160. De-duplication engine 190 performs de-duplication of incoming data to be stored on SSD 155. Firmware for de-duplicating data according to embodiments of the present disclosure can be stored in the de-duplication engine 190 or can be stored in another location of SSD 155, so long as de-duplication engine 190 has access to the firmware. Flash controllers 195 interface with flash memories 160.

Traditional optimizations at the device driver layer or the block driver layer operate on logical blocks of data and attempt to optimize these logical blocks of data for SSDs. These traditional optimizations are agnostic of the relationship between a logical block of data and the user's notion of a file/application. Accordingly, in traditional systems, context information of which application the logical block of data belongs to is lost when the data reach the layers closer to the SSD.

In contrast to conventional systems, the disclosed approach uses a cross-layer optimization. The disclosed process and system passes information about the data to be stored to the next layer in the storage hierarchy along with the actual data i.e., the actual data to be stored are tagged with certain context information. This additional information about the data payload can be referred to as hints. These hints can be stored as header information and can be referred to as metadata. The hints can be information about the context of the data, for example, whether the data is a word document, a medical image, a media file, etc.; whether the data is random; whether the data in the payload is duplicative of other data being stored to the SSD; the sensitivity level of the data; and/or whether the data is compressed and/or randomized. Further, in some embodiments, the higher level application layers can divide a data file into sub-objects and provide context information for each sub-object in a corresponding header for each sub-object. Accordingly, the application layer can divide up a file so that an SSD can de-duplicate the smaller sub-objects using the context information in the header. Such context information can be used by the SSD firmware to optimize storage. Based on the hints, the SSD decides the best way to decrease the bandwidth or space requirements of the data by de-duplicating the data. Such cross-layer hints are especially useful for SSD where rewrites are expensive. Thus, identifying common files or the context of the data can be used to find duplicate/redundant data and prevent unnecessary rewrites of the data.

Figure 2:
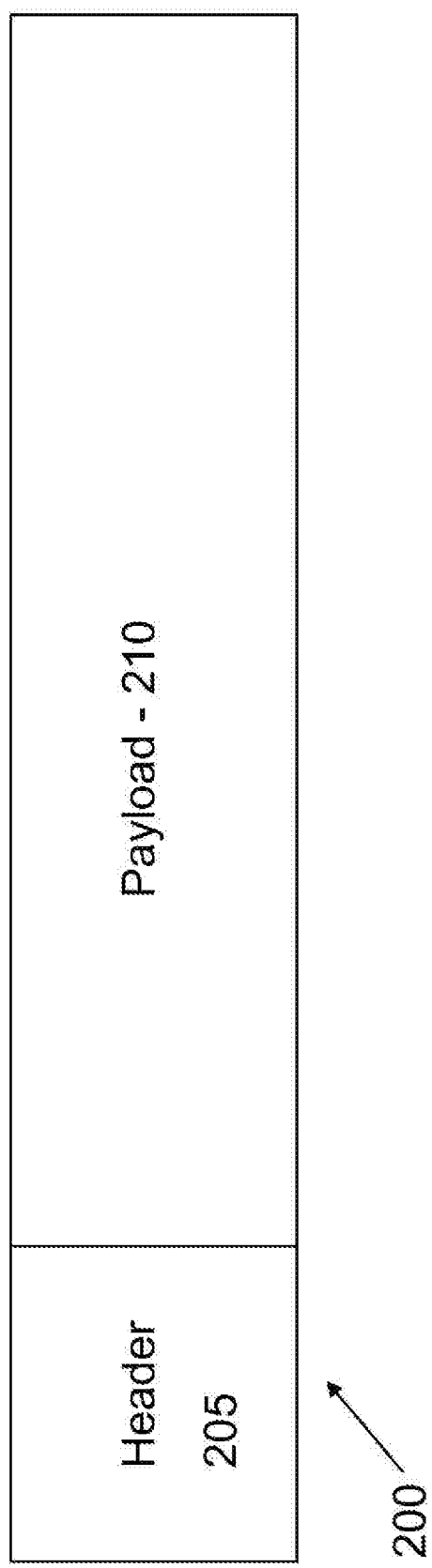
FIG. 2 depicts a data object.

FIG. 2 depicts a block of data 200 to be written to an SSD, for example a movie file. The movie file includes a header 205 and a payload 210. Payload 210 contains the actual data to be written to the SSD and can be composed of, for example, 200 video frames. In conventional systems, header 205 may have some information, provided by the application layer software that either created or played the movie. This information can include where the data begins and ends. In conventional systems, the SSD will ignore information in the header and will hash the entire file to determine if the SSD has already previously stored the file and perform de-duplication only based on that information.

However, in the disclosed system, header 205, in addition the information discussed above, includes the hints or contextual information provided by the other application layers. Accordingly, header 205 includes information about the type of data stored in payload 210 that can assist the SSD in determining whether or not the SSD should de-duplicate the data stored in payload 210. The hints can be stored at the beginning and/or the end of data headers and payloads. For example, if payload 210 is a movie file, the application layer that created or played the movie file can store information in header 205 indicating that the file is a movie file.

In addition, application layer intelligence can assign a sensitivity level to each object to let a de-duplication engine decide the "cost" of a false positive in identifying an object. De-duplication is not a perfect process. Sometimes, portions of files can be lost during de-duplication. Sensitivity level refers to the consequences of returning a wrong frame for a given set of data. For example, returning a wrong frame in a streaming video with a possibility of one in a million might be acceptable, but returning an incorrect X-Ray image is not acceptable under any circumstances. Accordingly, for some files, where a skipped frame or piece of data is crucial, de-duplication should not be performed. For other data, where a skipped frame would go unnoticed, the space saving benefits of de-duplication outweigh the risks of the occasional lost file. Accordingly, because a user generally will not notice a skipped frame in a movie file, the application layer also can assign a low sensitivity level to payload 210 in header 205. This will tell the SSD that it can de-duplicate the data with a low risk of error. However, if payload 210 is a more sensitive file, that is, a file where a missed frame could substantially alter the file, e.g., medical images, x-rays, the application layer can assign a high sensitivity level to the file in header 205. This high sensitivity level would result in the SSD not de-duplicating data in payload 210 because the consequences of a lost file outweigh the benefits of de-duplication. This sensitivity level information can be included in the header and passed down to the SSD from the higher level application layer.

In some embodiments, the SSD can derive contextual information about a data file from existing header information, without having the application layer software embed additional contextual hints into the header. For example, a SSD knows the structure of the header, it knows when the header starts and finishes and when the data payload starts and finishes. Based on the existing information in the header, the SSD can make determinations about whether to de-duplicate the data payload. The header may point to the start of field that IS either compressible or not. The header also points to the subsets of data that can be treated as a unit and have similar properties. For example the header can point to the beginning and end of a frame in a movie.

In another embodiment, data is analyzed to determine if it is random. Because non-random data is more easily and effectively de-duplicated, in some embodiments, the SSD can perform de-duplication only on the non-random data, not all the data within a particular block. In some embodiments, the non-random data is compressed, instead of de-duplicated, prior to storage in the SSD. As discussed earlier, when data is compressed, it becomes randomized and then optionally can be de-duplicated. In addition, once the non-random data is randomized via compression or if the data is randomized in original form, a subset of randomized data can be included for building a hash (rather than trying to hash the whole stream). Accordingly, because the random data can be as unique as a hash, a subset of the random data can be used for comparison to previously stored files, instead of generating a hash of the data. By using a subset of the random data instead of a hash, processing time for de-duplication can be reduced.

Figure 3:
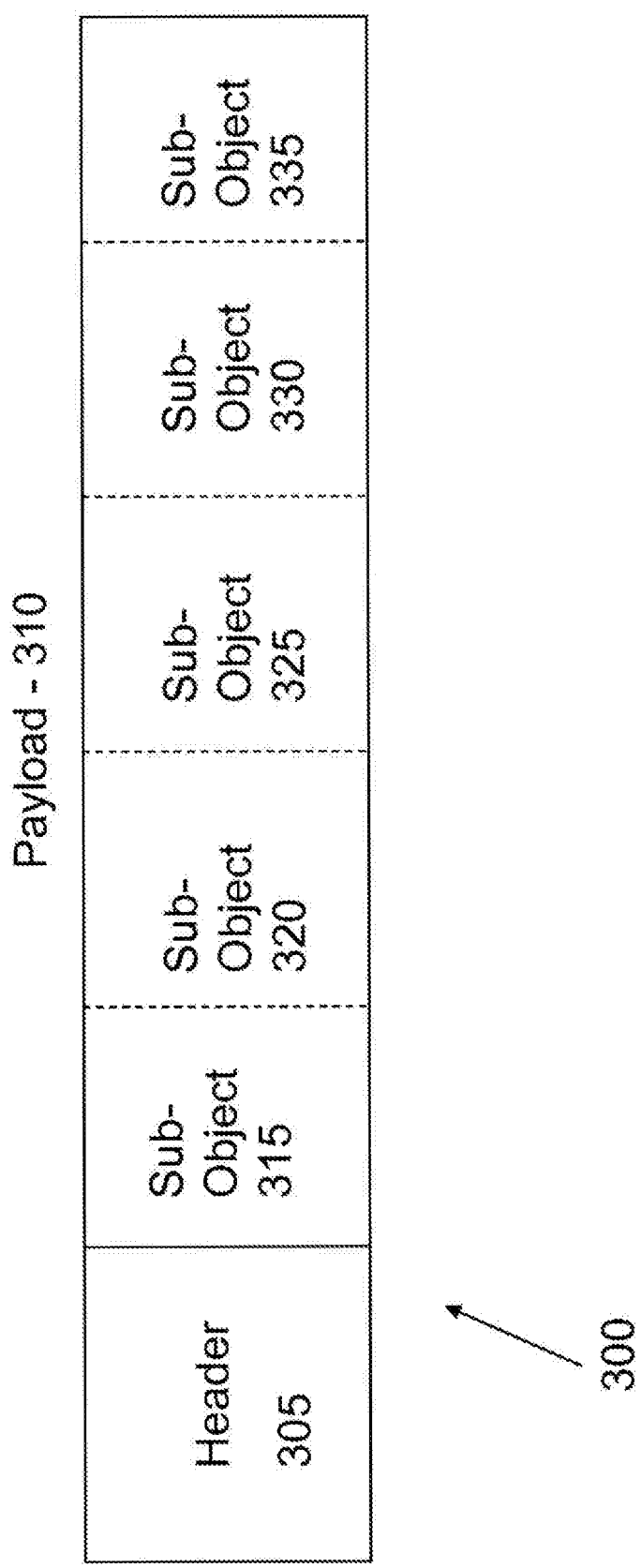
FIG. 3 depicts a data object including sub-objects.

In some embodiments, the disclosed de-duplication method uses sub-object level granularity of the data payload to enhance the de-duplication process. In this process, the SSD identifies headers of subsets of objects that might be common across two or more objects. FIG. 3 depicts a data object 300 having a header 305, a payload 310 and sub-objects 315, 320, 325, 330 and 335. The header contains, among other things, the context information and metadata passed down from the application layers. This data has one header for all sub-objects. However, in some embodiments, the higher application layers can break down the data into sub-objects. For example, a Moving Picture Experts Group (MPEG) 4 viewer application, using software or firmware programmed according to the disclosed methods, can take a 200 frame MPEG4 movie file and break the movie file down into sub-objects of 50 frames each. The application can then create a separate header associated with each sub-object. The MPEG4 viewer can store information in the header including: the frames at which the sub-object begins and ends; a sensitivity level (low for a movie file); an indication that the object is compressed; and an indication that the object is random.

Figure 4:
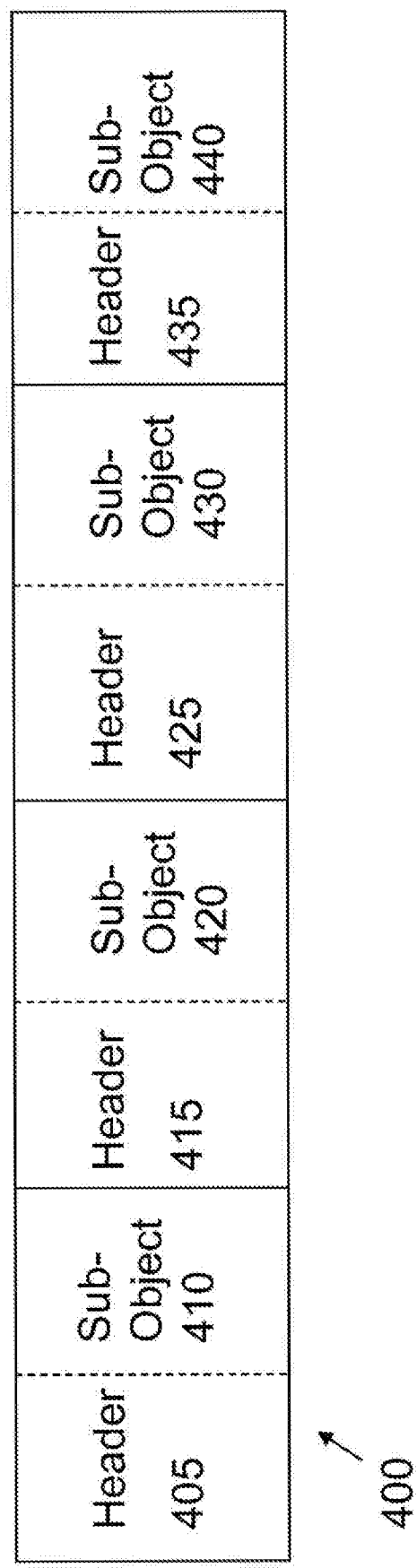
FIG. 4 depicts a data object including sub-objects having a header for each sub-object.

For example, as shown in FIG. 4, data object 400 can have, for example, four sub-objects of 50 frames 410, 420, 430 and 440, and four corresponding headers 405, 415, 425, 435, one for each sub-object. Sometimes, even though two objects or files might not be identical, they might both have identical sub-objects with their own headers or metadata. By breaking the file up into multiple objects, data files that would not be identical under normal de-duplicating operations, i.e., two word documents with the second word document having an added paragraph, the SSD can use the information in the header to compare portions of the second word document to a first stored word document and only can save the sub-objects that are different and provide references for the remainder of the identical data and including references to previously stored data for the duplicate data.

Figure 5:
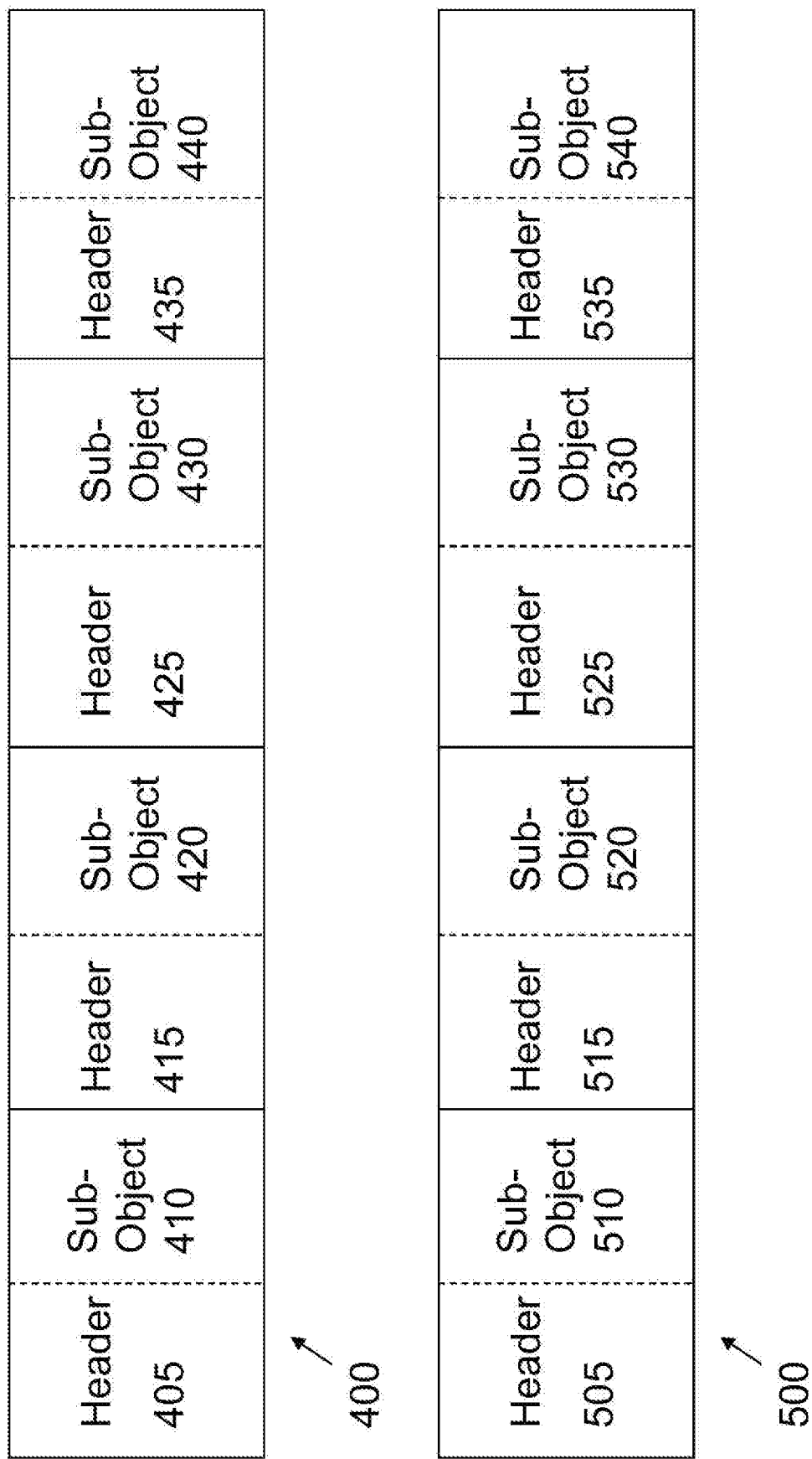
FIG. 5 two data objects including sub-objects having a header for each sub-object.

For example, FIG. 5 depicts two objects 400 and 500. Object 400 has four sub-objects 410, 420, 430, and 440 and four corresponding headers 405, 415, 425, 435. Object 500 has four sub-objects 510, 520, 530, and 540 and four corresponding headers 505, 515, 525, 535. If sub-object 430 in object 400 is identical to sub-object 530 in object 500, then the SSD can perform de-duplication when it stored objects 400 and 500 by not saving a duplicate version of 430. Additionally, if headers 425 and 525 also are identical, the SSD can chose not to write header 525 to memory. This enables the SSD to avoid writing duplicate sub-objects and headers.

For example, if two videos are stored on an SSD, where one video is a subset of the other, the videos can share many common frames. The present system and method analyzes the metadata of the second video to find common frames or sub-objects with the first video. Then, the SSD can de-duplicate the data using the common sub-objects. Specifically, a video viewer application instructs the SSD to save a 200 frame movie to the SSD. The application layer separates out the 200 frame movie into four 50 frame sub-objects, each with its own header. A user then separately wants to store the final 100 frames of the movie to the SSD as a separate file. The application layer would then separate the file into two 50 frame sub-object, each with a separate header. In prior de-duplication systems, because these two files (200 frame file and 100 frame file) were different and would produce different hash values, prior systems would not de-duplicate and would store both files separately. However, using the disclosed de-duplication method, the SSD hashes sub-objects and compares the hash to hashes of existing data, using information from each header and would be able to determine that the two 50 frame sub-objects in the 100 frame file are identical to the last two 50 frame sub-object files of the 200 frame file. Accordingly, the SSD stores a reference to the last two sub-objects of the 200 frame file instead of storing that information redundantly on the SSD.

This type of solution is helpful in a virtualized environment where different virtual machines may be accessing the same file. Generally, virtualized systems contain many copies of the same data. Some of those copies are identical, while other copies are slightly modified. For example, a company of twenty people can have a single server on which the company operates twenty virtual machines for each of the twenty employees. Each of the twenty employees can have a copy of the same 20 page presentation saved on the server. Using the de-duplication methods disclosed above, the server can determine that the presentations are identical and save only one copy of the presentation to the server. Additionally, assume one employee makes an edit to page 1 of the presentation and saves it to the server; a second employee makes an edit to page 5 of the presentation and saves it to the server; and a third employee makes a change to page 10 of the presentation and saves it to the server, and so on. Instead of having to save four copies of the entire presentation to the server (one original and three altered versions), through the sub-object level de-duplication methods disclosed above, the server can store only altered pages of the altered presentations, instead of the entire altered presentation.

In one aspect, the disclosed method can identify headers and objects corresponding to the headers (video, document, image) for de-duplication, based only on the header information, without looking at payload or object data. For example, with two video files that contain multiple sub-objects, each with its own header, some of the sub-objects between the two files with have the same header information because the corresponding sub-objects are identical. Therefore, the SSD firmware need only compare the header information, instead of hashing the data and comparing to other data hashes in memory to determine if one or more sub-objects of the second video can be de-duplicated.

For some data, the headers may be different, but the sub-objects are the same. In these cases, the SSD can look beyond the header information to the actual data to determine whether or not the data is duplicative.

In some cases (for example, a video) some of the metadata are identical and in some cases the metadata change with the context. The disclosed method and system separates data and metadata for de-duplication. This enables the system to recognize the metadata in sub-objects (for example, frames in a video stream or pages in a document) and create hashes for them in the SSD layer.

In order to assign a unique signature to identify any piece of data, a computationally intensive operation is necessary. The most commonly used algorithm for producing a signature is a secure hash algorithm (SHA). Because the SHA-2 algorithm can produce unique signatures and is computationally expensive, the best approach is to decouple its implementation from the main processor. An Application Specific Integrated Circuit (ASIC) or other dedicated circuit inside the SSD can be used to implement this functionality in a way that scales. As discussed above, generating a key from random data can be done using a large enough substring of a random string. This substring can serve as a good hash key. For non random data, a hashing algorithm is required. If a hash engine is implemented inside an SSD that can be used as well (or hashing can be done by the host).

An issue with conventional SSDs is that the SSD views the blocks of data from upper layers as a stream of bytes and does not know the context i.e., the ability to separate random and non-random data. To solve this problem, one aspect of the present method internally partitions the SSD into two areas. The SSD can place data and metadata of different object types in separate areas of disk to optimize disks behavior in response to different data types. In order to separate data from the header, the SSD needs to know where the headers and data begin and end. If the headers are fixed, the SSD can use a hash to identify them (and de-duplicate them). If they are not fixed, but have certain patterns, the disclosed system can use regular expressions or other parsing methods to parse the headers and identify those. The main idea is to separate the payload that is usually compressed from the headers that are usually clear text. Once the headers and the data are separated, the headers can be compressed and stored and the data can be de-duplicated and stored or referenced, according to embodiments of the present disclosure. Because the metadata in the header is usually compressible; is usually smaller and usually has less longevity. Accordingly, the SSD can treat the different locations that store metadata and data differently for wear leveling and for garbage collection. Additionally, the SSD can use generated keys to uniquely identify both the random and non-random data.

Typically, there are two types of de-duplication: inline and background. Inline de-duplication occurs when data are being written to the device and has the drawback of reducing the response time (or diminishing SSD cache capacity). One embodiment of the present disclosure de-duplicates when the system is doing garbage collection. This has two advantages: (1) it does not affect the immediate response time of the SSD, and (2) it only de-duplicates pages that are more likely to stay (and occupy storage over longer time), rather than transient pages. For example, the background de-duplication can occur when the SSD is writing a super block to a new location in memory as a result of garbage collection. In this case, the SSD can de-duplicate the data that is moved. Because the SSD already has to move the data and this operation takes place in the background, the overhead of this de-duplication will be very low.

Figure 6:
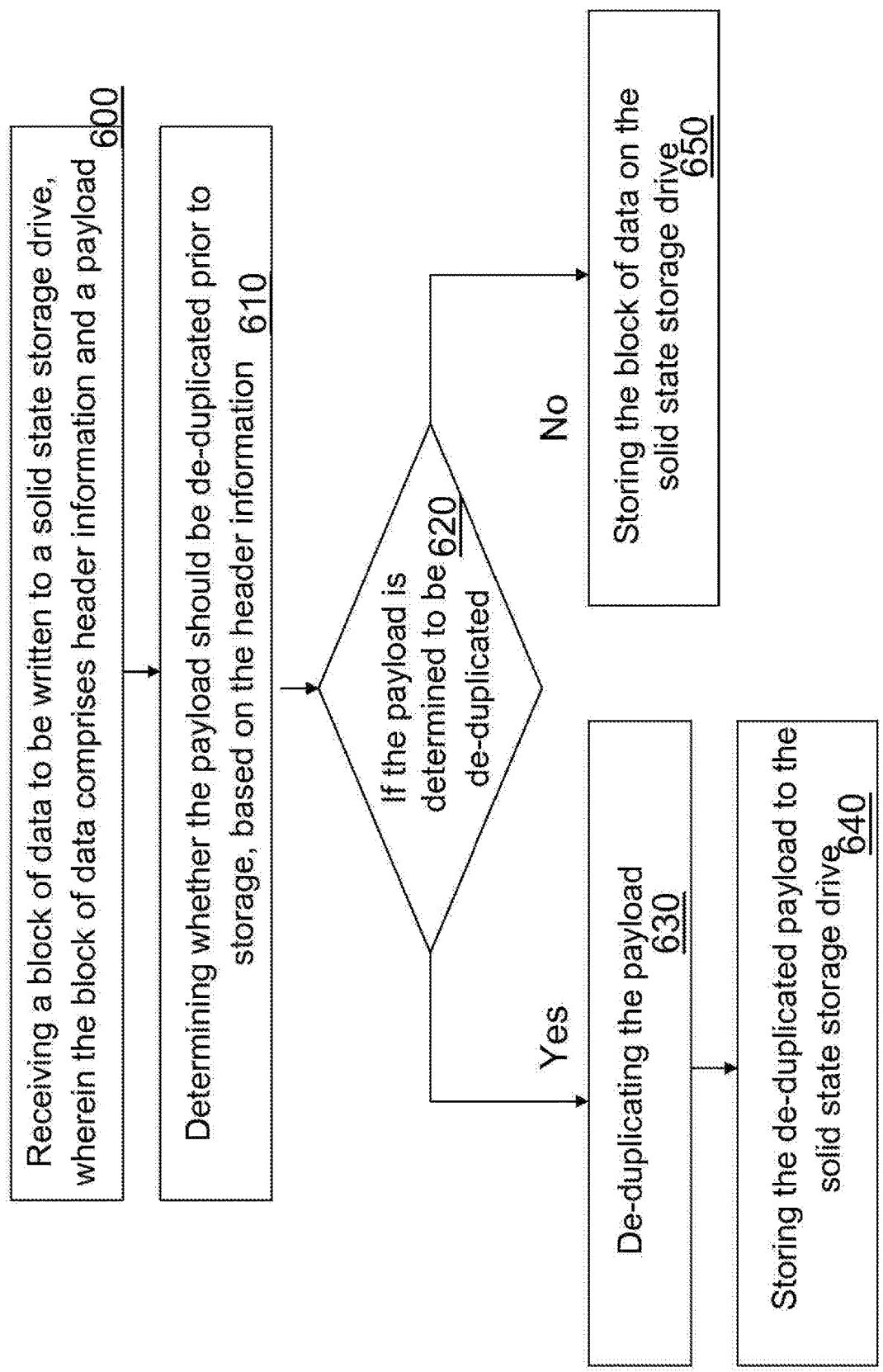
FIG. 6 depicts a high level flow chart of a method of de-duplicating data, according to one embodiment of the present disclosure.

FIG. 6 depicts a high level flow chart of a method of de-duplicating data in a solid state storage device, according to one embodiment of the present disclosure. At Step 600, a solid state storage device receives a block of data to be written to a solid state storage device, wherein the block of data comprises header information and a payload. In Step 610, the solid state storage device determines whether the payload should be de-duplicated prior to storage, based on the header information. In Step 620, if the payload is determined to be de-duplicated, Step 630 ensues and the solid state storage device de-duplicates the data. After the solid state storage device de-duplicates the data, in Step 640, it stores the de-duplicated payload. In some embodiments, the solid state storage device also de-duplicates header information and stores it to the solid state storage device. If in Step 620, the payload is not determined to be de-duplicated, Step 650 ensues and the solid state storage device stores the block of data on the solid state storage device.

Figure 7:
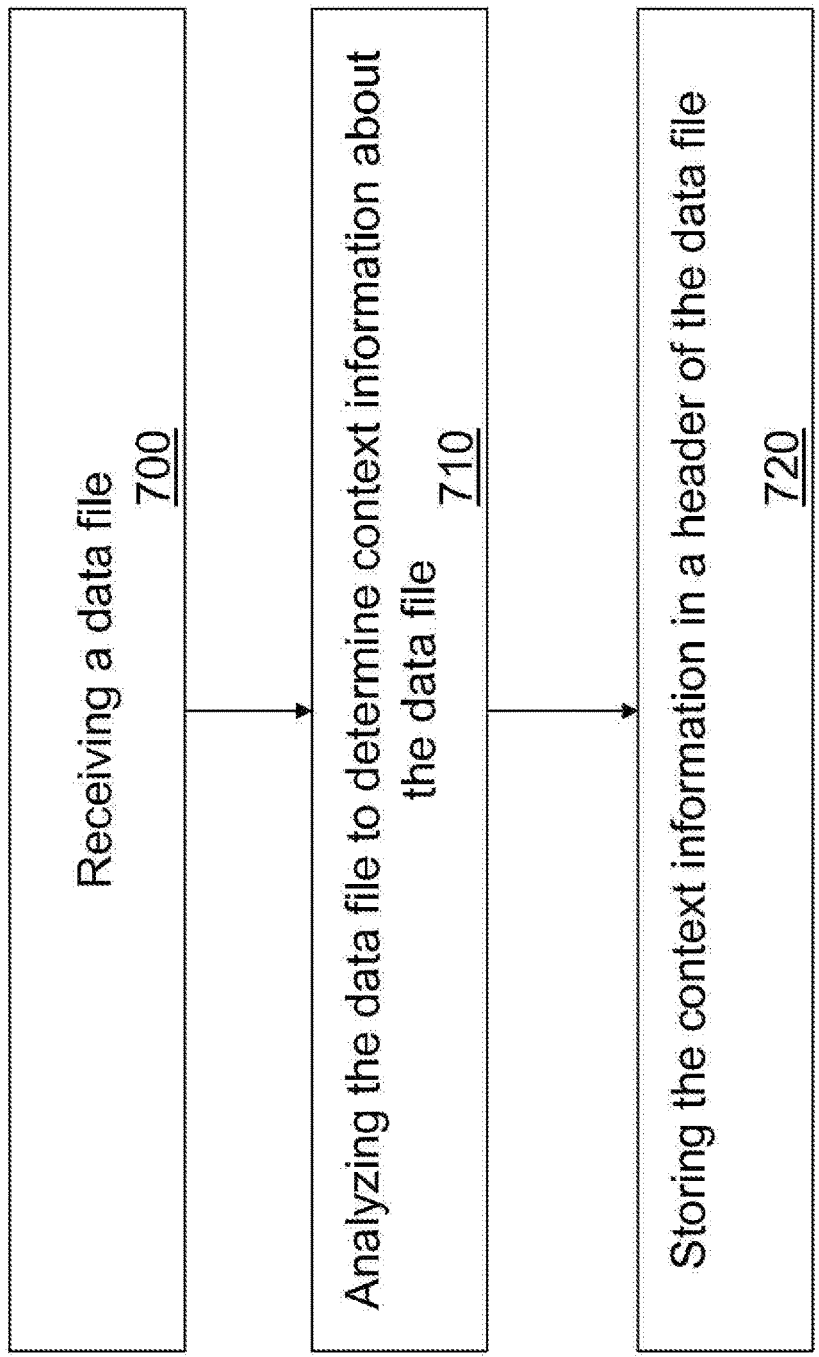
FIG. 7 depicts a high level flow chart of a method of storing files to assist in subsequent de-duplication of those files, according to one embodiment of the present disclosure.

FIG. 7 depicts a high level flow chart of a method of storing files to assist in subsequent de-duplication of those files, according to one embodiment of the present disclosure. In Step 700 an application layer software program receives a data file. In Step 720, the application layer software program analyzes the data file to determine context information about the data file. In Step 720, the application layer software program stores the context information in a header of the data file.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

While there have been shown and described examples of the present invention, it will be readily apparent to those skilled in the art that various changes and modifications may be made therein without departing from the scope of the invention.

What is claimed is:

1. A method for providing object level de-duplication for solid state storage devices (SSDs), comprising:
   receiving, at a solid state storage device (SSD), a block of data comprising a header portion and a payload, wherein the header portion comprises context information indicative that the payload comprises non-random data, and wherein the payload is received from a first location within memory of the SSD;
   determining, by the SSD, that the payload should be de-duplicated prior to storage based solely on the context information stored within the header portion without analyzing the payload;
   randomizing the non-random data of the payload;
   de-duplicating, at the SSD, the payload comprising the randomized data; and
   storing the de-duplicated payload to a second location within the memory of the SSD,
   wherein the de-duplicating is performed when the SSD is moving the payload from the first location to the second location for garbage collection, and
   wherein the header portion is provided by an application layer software program that had previously accessed the payload.

2. The method of claim 1, wherein the context information is provided from hierarchical layers above the SSD.

3. The method of claim 1, wherein the payload comprises a plurality of sub-objects.

4. The method of claim 3, wherein the de-duplicating the payload comprises de-duplicating the payload based on a correlation between sub-objects of other payloads.

5. The method of claim 1, further comprising, before storing, separating out the header portion from the payload and storing the header portion and the payload in separate locations on the SSD.

6. The method of claim 1, further comprising deriving the context information from the header portion by analyzing the header portion in view of a known structure of the header portion without having an application layer software program embed additional contextual information into the header portion.

7. The method of claim 1, wherein the context information is uniquely associated with the payload.

8. A solid state device (SSD) providing object level de-duplication, comprising:
   a host interface for communicating to a host device;
   one or more flash memories for storing data; and
   a de-duplication engine comprising instructions stored in a non-transitory computer readable medium, wherein the instructions, when executed by a processor, are configured to cause:
      receiving a block of data, wherein the block of data comprises a header portion and a payload, wherein the header portion comprises context information indicative of whether the payload comprises random data, and wherein the payload is received from a first location within the one or more flash memories;
      determining the payload should be de-duplicated prior to storage based solely on the context information stored within the header portion without analyzing the payload;
      randomizing data of the payload;
      de-duplicating the payload comprising the randomized data; and
      storing the de-duplicated payload to a second location within the one or more flash memories,
      wherein the de-duplicating is performed when the SSD is moving the payload from the first location to the second location for garbage collection, and
      wherein the header portion is provided by an application layer software program that had previously accessed the payload.

9. The solid state device of claim 8, wherein the instructions are configured to determine that the payload should be de-duplicated based on the context information indicating that the payload is non-random.

10. The solid state device of claim 8, wherein the context information is provided from hierarchical layers above the SSD.

11. The solid state device of claim 8, wherein the payload comprises a plurality of sub-objects.

12. The solid state device of claim 11, wherein the de-duplicating the payload comprises de-duplicating the payload based on a correlation between sub-objects of other payloads.

13. The solid state device of claim 8, wherein the instructions are further configured to cause, before storing:

separating out the header portion from the payload and storing the header portion and the payload in separate locations on the SSD.

14. A solid state device (SSD) providing object level de-duplication, comprising:
   means for communicating to a host device;
   means for storing data;
   means for receiving a block of data, wherein the block of data comprises a header portion and a payload, wherein the header portion comprises context information indicative of whether the payload comprises random data, and wherein the means for receiving comprises means for receiving the payload from a first location within the means for storing data;
   means for determining the payload should be de-duplicated prior to storage based solely on the context information stored within the header portion without analyzing the payload;
   means for randomizing data of the payload;
   means for de-duplicating the payload comprising the randomized data; and
   means for storing the de-duplicated payload to a second location within the means for storing data,
   wherein the means for de-duplicating the payload comprises means for de-duplicating the payload when the SSD is moving the payload from the first location to the second location for garbage collection, and
   wherein the header portion is provided by an application layer software program that had previously accessed the payload.

15. The solid state device of claim 14, wherein the context information is provided from hierarchical layers above the SSD.

16. The solid state device of claim 14, wherein the payload comprises a plurality of sub-objects.

17. The solid state device of claim 16, wherein the means for de-duplicating the payload comprises means for de-duplicating the payload based on a correlation between sub-objects of other payloads.

18. The solid state device of claim 14, further comprising means for separating out the header portion from the payload, and wherein the means for storing the de-duplicated payload comprises means for storing the header portion and the payload in separate locations on the means for storing data.

19. The solid state device of claim 14, wherein the context information indicates that the payload is non-random.

* * * * *